United States Patent
Medawar

[11] 3,815,215
[45] June 11, 1974

[54] METHOD OF FORMING A HONEYCOMB STRUCTURAL PANEL

[75] Inventor: George E. Medawar, San Diego, Calif.

[73] Assignee: Rohr Industries, Inc., Chula Vista, Calif.

[22] Filed: Oct. 6, 1972

[21] Appl. No.: 295,459

[52] U.S. Cl................ 29/460, 29/471.1, 29/480, 29/527.1, 29/526, 161/68, 264/267
[51] Int. Cl..................... B23p 3/00, B23p 19/04
[58] Field of Search............ 29/460, 455 LM, 527.1, 29/530, 527.2, 155, 480, 526, 471.1; 264/267; 161/68; 52/81

[56] References Cited
UNITED STATES PATENTS

| | | | |
|---|---|---|---|
| 2,720,948 | 10/1955 | Pajak | 29/455 LM UX |
| 2,744,042 | 5/1956 | Pace | 29/455 LM UX |
| 3,110,064 | 11/1963 | Koontz | 52/81 X |
| 3,137,744 | 6/1964 | Burrus | 29/460 UX |
| 3,166,831 | 1/1965 | Keith | 29/155 |
| 3,470,598 | 10/1969 | Berthelsen | 29/527.1 X |
| 3,757,559 | 9/1973 | Welsh | 720/379 |

*Primary Examiner*—Charlie T. Moon

[57] ABSTRACT

A honeycomb structural panel has a first portion of original manufactured thickness and a second portion, integral therewith, of substantially less thickness. In the first portion, the core cell walls are straight from end to end and parallel with each other. In the second portion, the cell walls are axially crushed and distorted so that their overall lengths are less than their original lengths. The crushed cell walls are much weaker than the others. Therefore, these cells are filled with plastic cured to a rigid state. Since all of the walls are confined in the plastic, they can no longer distort, and the combination of cells and plastic is adequate for the imposed loads. The method involved consists in forming apertures in a selected portion of one facing sheet, with at least one aperture communicating with each cell, filling the cells through the apertures with a liquid filler, pressing the facing sheets together to crush the cell walls while extruding excess filler through the apertures, and then curing the filler in place to a rigid state to reinforce the crushed cells.

6 Claims, 4 Drawing Figures

METHOD OF FORMING A HONEYCOMB STRUCTURAL PANEL

BACKGROUND OF THE INVENTION

This invention lies in the field of honeycomb structural panels, more particularly those made entirely of metallic material, and is directed to a dual thickness panel of this type and a method of producing such panel.

Honeycomb structures of various types and materials have come into extensive use in recent years for many different purposes. Two of their most desirable features are great rigidity and very high strength to weight ratio. Panels of honeycomb have been used for sign boards, building structures, and for aircraft structural components. In this latter field, such panels have used metal almost exclusively because of the demand for strength and resistance to high temperatures. Materials used include aluminum, steel and titanium.

As is well known, a typical honeycomb panel includes a honeycomb core of a miltiplicity of cells bonded together in side by side relation and opening onto the opposite faces of the core, together with a facing sheet applied to each face of the core and bonded to the end edges of the cell walls to form an integral structural component. In many cases, it is necessary to overlap the ends of adjacent components while maintaining a smooth external contour. The normal thickness of the panels precludes this possibility and therefore it is necessary to reduce the thickness of the joining edges by one half or more. It is also required frequently to reduce edge thickness to attach such panels to heavy structural members which have shallow inset shoulders.

Various schemes to accomplish this end have been tried in the past but have not been satisfactory for one reason or another. One scheme has been to squeeze the marginal portions of the facing sheets together and axially crush the cells. The distorted walls obviously no longer have the column strength of the original straight walls and panel.

Another scheme has been to omit or gouge out the cells in the marginal portion and replace them with a solid piece of material. Thus, strength is retained but the cost of forming such panel is excessive and the process is time consuming.

An additional scheme which has been tried from time to time is to initially sculpture the core, or machine away the excess height of the cells in the marginal area, and then shape the facing sheet before assembling the panel. This is obviously very difficult and time consuming and the cost is very high.

SUMMARY OF THE INVENTION

The present invention overcomes the difficulties mentioned above and provides a structural component and method of making it which maintains full strength and requires only a few simple manufacturing steps which are accomplished rapidly and at low cost.

Generally stated, the construction which incorporates the invention initially has the same general configuraiton as a conventional panel to be used for the purpose. It includes a honeycomb core made up of a multiplicity of cells bonded to each other to form an integral structure and opening at the opposite faces of the core in substantially parallel relation with each other, and a continuous facing sheet overlying each face of the core and bonded to the ends of the cells to complete the panel.

In the panel of the invention, the walls of the cells in a first portion of the panel remain straight and substantially parallel with each other from one facing sheet to the other. However, in a second selected portion of the panel where marginal attachment is to be achieved, the facing sheets are closer together than in the first portion and the walls of the cells are axially crushed and distorted so that they are no longer parallel, and the overall lengths of these cells are less than their initial straight line lengths. Hence the selected marginal portion of the panel is thinner than the first portion to any predetermined extent.

Since the cell walls in this portion are not straight, their column strength is greatly reduced. This difficulty is overcome by the presence of rigid filler material in all of these cells. The filler material completely occupies each of the cells and is in direct contact with their irregular walls. Thus it prevents any further lateral distortion and precludes column failure. Moreover, it adds its own column strength to the combination. Thus the marginal portion is reinforced sufficiently to readily sustain the loads which are intended to be imposed on it.

The construction described is produced by providing openings or apertures in at least one of the facing sheets in the selected marginal area of the conventional honeycomb panel, with at least one aperture communicating with each cell. A filler material in liquid state is then inserted in each cell through the apertures until the cells are substantially completely filled. While the filler material is still liquid, suitable tooling is used to press the two facing sheets toward each other, crushing the cells axially until the desired final thickness of the panel is attained. During this compression action, excess material is extruded from the cells through the apertures. After the forming is completed, the filler material remaining in the cells is cured to a rigid state to perform its reinforcing function.

While the invention may be applied to honeycomb panels of practically any of the presently used materials, it is particularly intended and especially useful in metallic structures, more particularly those made of steel or titanium. In most cases where the invention is incorporated, the panels have parallel faces in both the main and the thinned down marginal portion. However, the invention is not so limited and can be applied equally well to panels in which the main body or the marginal portion or both may vary in thickness from one area to another.

BRIEF DESCRIPTION OF THE DRAWING

Various other advantages and features of novelty will become apparent as the description in conjunction with the accompanying drawing, in which.

DESCRIPTION OF PREFERRED EMBODIMENTS

Figure 1:
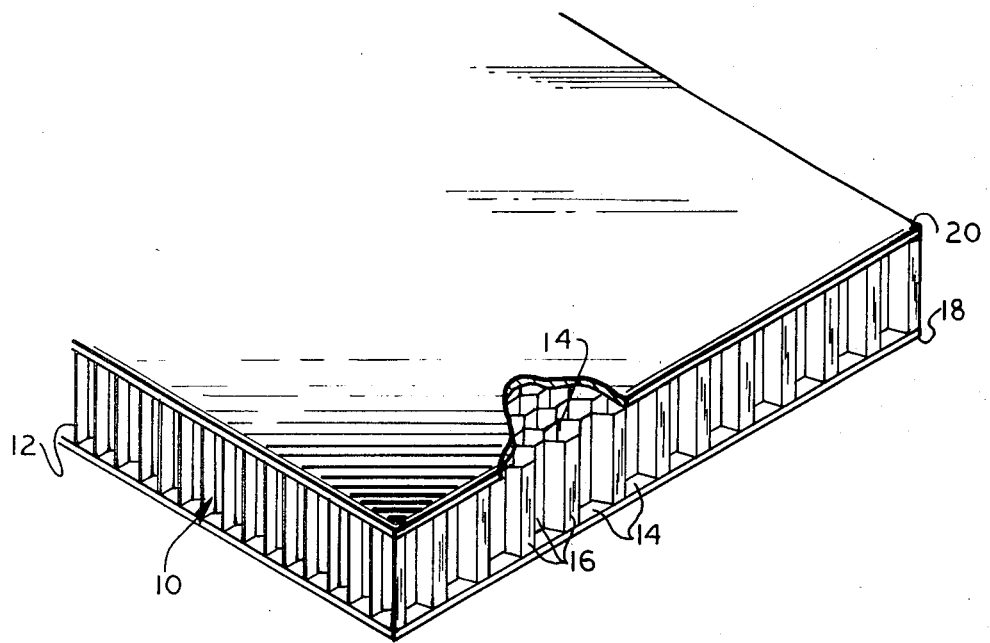
FIG. 1 is a fragmentary schematic view in perspective of a conventional honeycomb panel to which the invention is to be applied.

The basic conventional metallic honeycomb structure to which the invention is to be applied is illustrated in FIG. 1, in which a honeycomb core 10 is made up of a multiplicity of corrugated metal strips 12 arranged in parallel with the nodes of adjacent strips in contact with each other and bonded together by any suitable means, such as welding or brazing, to form a multiplicity of generally hexagonal cells 14 having walls 16 bonded into an integral structure and opening at the opposite faces of the core. Facing sheets 18 and 20 are arranged in contact with the opposite faces of the core and are bonded to the ends of the cell walls by any suitable means, including welding and brazing.

Figure 2:
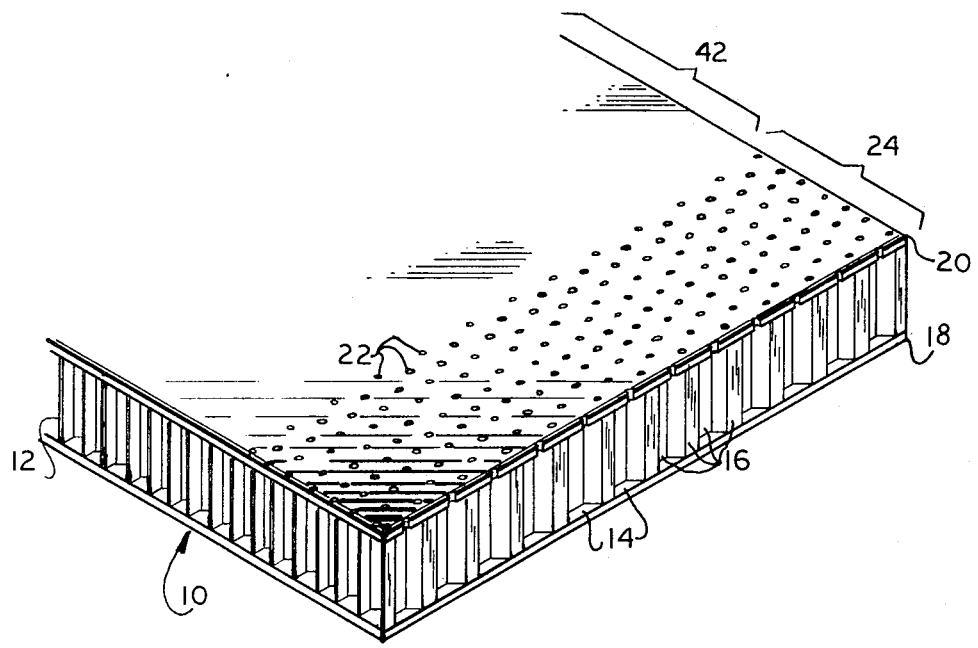
FIG. 2 is a view similar to FIG. 1, showing apertures in a facing sheet communicating with underlying cells.

Turning to FIG. 2, it will be seen that apertures 22 have been formed in a selected marginal portion 24 of sheet 20 communicating with the cells. There is at least one aperture for each cell. In the case of acoustic honeycomb which is presently used extensively in aircraft and engine construction, sheet 20 would already be provided throughout substantially its entire area with apertures suitable for the present purpose.

Figure 3:
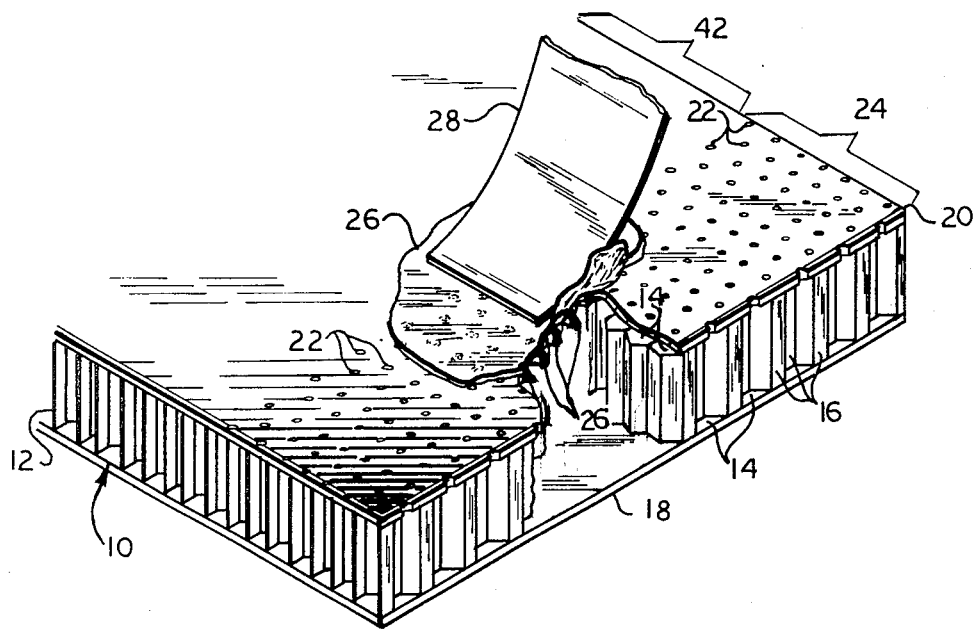
FIG. 3 is a view similar to FIG. 2, showing the application of liquid filler to the cells.

While the filler material in its liquid state may be inserted in the cells in various ways, the presently preferred system is illustrated in FIG. 3. The material 26 is spread over the selected portion and a spreader blade 28 is drawn across the facing sheet in contact therewith and at an angle thereto over the material, forcing some of it through apertures 22 into the cells. Since the apertures are small and the cells relatively deep, the process of spreading a layer of the material and applying the spreader blade is repeated until the cells are substantially completely filled.

Another method of applying the filler material, in cases where the size and shape of the panel render it practical, is to immerse at least the selected marginal portion 24 of the panel in a bath of the filler material in its liquid state until the cels are filled. The bath for carrying out this method is not shown.

Figure 4:
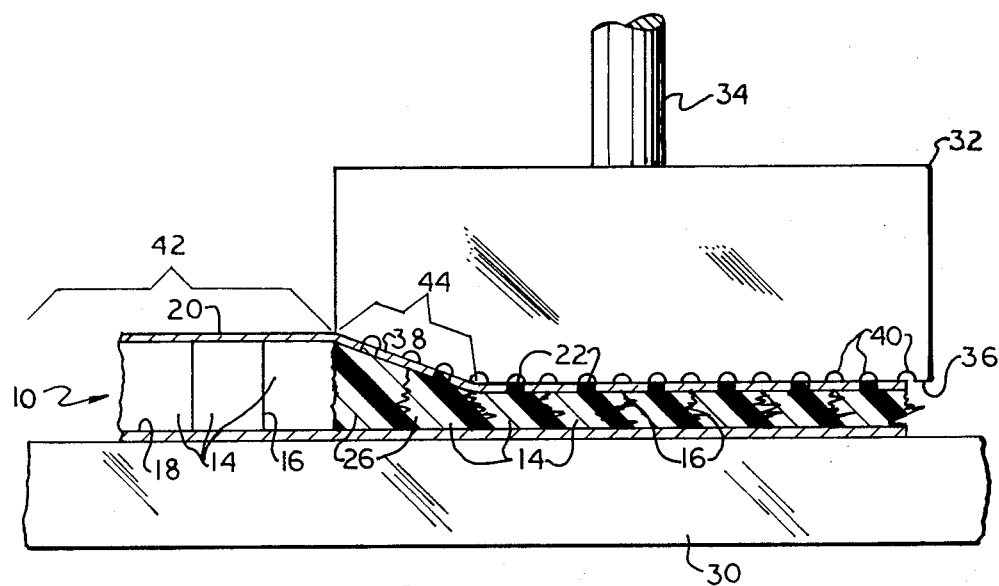
FIG. 4 is a side elevational view, partly in section, showing the crushing operation and the final configuration of the panel.

Various methods may be used for compressing marginal portion 24 of the panel and crushing the cells, but the presently preferred method is illustrated in FIG. 4. The panel is laid on the bed 30 of a mechanical or hydraulic press in the position shown under presser foot 32 carried by shaft 34 which is actuated by a ram head, not shown. The lower face 36 of the presser foot is generally planar to correspond with the surface of the panel and may have an angled portion 38 corresponding to the final transition form of the finished panel. The presser foot is coextensive with marginal portion 24 in its lengthwise direction and is provided in face 36 with a plurality of grooves or flow channels 40 which may extend longitudinally or transversely of face 36.

When foot 32 is lowered under pressure by the ram, it engages portion 24 of facing sheet 20 and forces it toward facing sheet 18 to the extend necessary to achieve the desired final thickness. In the process, the walls 16 of the cells 14 are axially crushed and distorted as indicated. As the volume of these cells decreases, the excess filler material is extruded through apertures 22 and travels along flow channels 40 to waste. The main portion 42 of facing sheet 20 retains its original form and distance from facing sheet 18, and intermediate portion 44 is angled to form the transition between portions 42 and 24. After the forming is completed, presser foot 32 is raised, the panel is removed from the press, and the filler material 26 is subjected to a cure cycle, rendering it rigid and strong.

In order to accomplish its intended purpose, the filler material used must be quite rigid and develop high strength. It must be capable of withstanding service temperatures of 553° F for a total of 10 hours' exposure in two-minute intervals. It must also initially be sufficiently fluid to be injected through approximately one-sixteenth inch diameter apertures in the facing sheet 20 and have sufficient working life to permit completion of the multiple injection operation. A very suitable filler material is a potting compound comprising dicyclopentadiene dioxide, maleic anhydride, a bifunctional epichlorohydrin A epoxy resin, and a filler selected from the group including calcium carbonate and silica. This compound and variations thereof are more fully disclosed in the copending U.S. Pat. application of Muriel Koss for Potting Compound, Ser. No. 266,276, filed June 26, 1972. Such disclosure is incorporated herein by reference.

Other materials which might be substituted for the above and which are commercially available at the present time are NOVIMIDE 700 and NOVIMIDE 700/6. These are novolac epoxy based compounds.

It will be apparent that, in their crushed and distorted condition as shown in FIG. 4, the cell walls have lost the major part of their initial column strength. However, the rigid filler material 26 which fills the cells and is everywhere in contact with the cell walls prevents any further lateral or axial failure of the walls. In addition, the filler material in each cell serves as an incompressible column. Consequently, the reinforced marginal portion 24 of the panel is strong enough to resist the design loads on the panel and will not thin down and become loose in the area of any fastener means which may be used.

I claim:

1. A method of forming a dual thickness honeycomb structural panel comprising:

providing a panel having a honeycomb core made up of a multiplicity of cells bonded to each other to form an integral structure and opening at the opposite faces of the core in substantially parallel relation with each other and a continuous facing sheet overlying each face of the core and bonded to the ends of the cells to complete the panel;

substantially completely filling each of the cells in a selected portion of the panel with a filler material in a liquid state;

pressing the facing sheets in said selected portion of the panel toward each other to axially crush the cells in said portion and reduce the thickness of the portion while extruding the excess filler material from the cells;

and curing the remaining filler material in situ in the cells to a rigid state to reinforce the cell walls and prevent their collapse.

2. The method as claimed in claim 1; including forming apertures in at least one of the facing sheets in said selected portion of the panel with at least one aperture communicating with each cell in said portion;

inserting the filler material into the cells thorugh the apertures until the cells are substantially completely filled;

and extruding excess filler material through the apertures during the pressing and crushing operation.

3. The method as claimed in claim 2; including:
spreading liquid filler material over the apertured portion of the facing sheet;
and moving an applying tool over the filler material to force it through the apertures.

4. The method as claimed in claim 2; including:
applying a layer of liquid filler material to the apertured portion of the facing sheet;
and drawing a spreader blade in contact with the sheet and at an angle thereto over the layer to force the material into the apertures;
and repeating the application of the filler material and the spreader blade until the cells are substantially completely filled.

5. The method as claimed in claim 2; including:
immersing the selected portion of the panel in a bath of liquid filler material until the cells are substantially completely filled.

6. The method as claimed in claim 2; including:
applying compression pressure to the apertured portion of the facing sheet with a presser foot having a generally planar contact face formed with a multiplicity of flow channels;
and causing the excess filler material extruded from the cells to flow through said channels to waste during the pressing and crushing operation.

* * * * *